Oct. 20, 1959  W. L. METZ ET AL  2,909,709
CIRCUIT INTERRUPTER CONTROL CIRCUITS
Filed Dec. 8, 1954
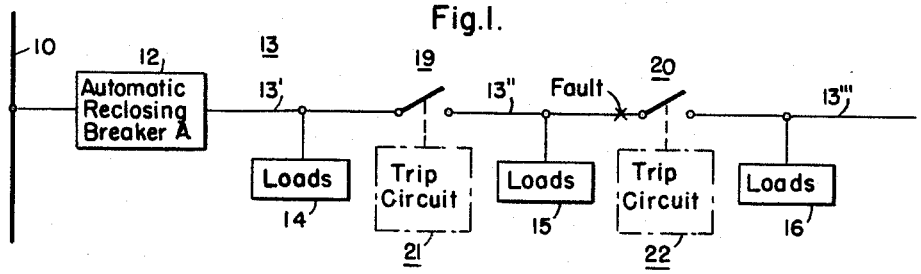
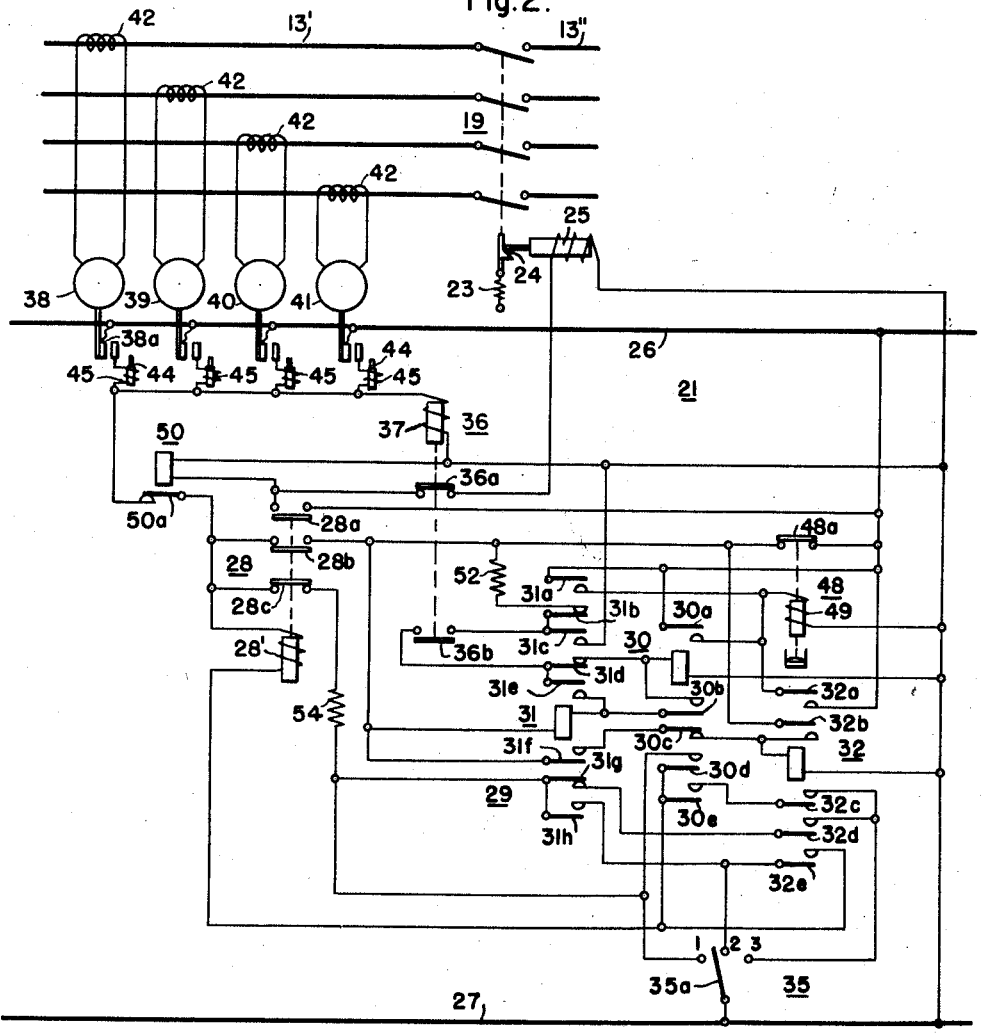
WITNESSES:
E.A. McCloskey
F.U. Giolma
INVENTORS
Weldon L. Metz
and Willard A. Derr,
BY
Ralph H. Swingle
ATTORNEY United States Patent Office 2,909,709
Patented Oct. 20, 1959

2,909,709

CIRCUIT INTERRUPTER CONTROL CIRCUITS

Weldon L. Metz, Penn Township, Allegheny County, and Willard A. Derr, Pittsburgh, Pa., assignors to Westinghouse Electric Corporation, East Pittsburgh, Pa., a corporation of Pennsylvania Application December 8, 1954, Serial No. 473,816

2 Claims. (Cl. 317—29)

Our invention relates generally to control circuits for circuit interrupters, and has reference in particular to a control circuit for controlling the operation of electrically operated switches for automatically sectionalizing feeder circuits.

Generally stated, it is an object of our invention to provide in a simple and effective manner for controlling electrically operated disconnect switches so as to provide for sectionalizing feeder circuits. According to our invention, the cost of providing a plurality of circuit breakers having fault interrupting capacity, for sectionalizing a feeder under fault conditions, is greatly reduced by using only a single automatic reclosing circuit breaker at the point of supply to the feeder, with less expensive disconnect switches operated in a novel way to interrupt the circuit at the proper sectionalizing point during an interval when the fault current has been interrupted by the circuit breaker.

More specifically, it is an object of our invention to provide for using a relay counting chain for effecting opening of a disconnect switch after a predetermined number of operations of a reclosing circuit breaker located between the switch and a source of electrical energy.

Another object of our invention is to provide an all-relay control circuit for tripping electrically operated disconnect switches to sectionalize a circuit, after a predetermined number of interruptions of the circuit by a circuit breaker.

It is also an object of our invention to provide for using a chain of counting relays which operate in conjunction with a multiposition control switch for effecting opening of an electrically tripped switch after different predetermined numbers of operations of a reclosing circuit breaker.

Other objects will, in part, be explained hereinafter and will, in part, be obvious.

In practicing our invention according to one of its embodiments, overcurrent relays in each of the phases of a polyphase feeder circuit are used to effect operation of a pulsing relay which controls a plurality of counting relays in response to interruption of an overcurrent by a reclosing circuit breaker. A multiposition selector switch is used to connect a trip relay so as to be controlled by the counting relays to open an electrically tripped disconnect switch to sectionalize the feeder circuit after different predetermined numbers of breaker operations, depending on the operating position of the selector switch.

For a more complete understanding of the nature and scope of our invention, reference may be made to the following detailed description, which may be read in connection with the accompanying drawing, in which:

Figure 1 is a schematic diagram of a feeder circuit utilizing a plurality of switches embodying the invention; and Fig. 2 is a diagrammatic view of the trip or control circuit for each of the switches shown in Fig. 1.

Referring to Fig. 1 of the drawing, the reference numeral 10 designates a distribution circuit having a circuit breaker 12 for connecting a feeder circuit 13 thereto. The circuit breaker 12 is any well-known type of multi-shot automatic-reclosing breaker having trip coils or over-current relays for causing it to open its contacts when a fault current flows therethrough, and having an automatic reclosing mechanism for closing its contacts a plurality of times if the fault current continues to flow, and then locks-out with its contacts open after a predetermined number of reclosures. If fault current does not flow through its contacts after one of the reclosures, its contacts remain closed and its mechanism resets to its initial position.

A plurality of loads or groups of loads indicated at 14, 15, and 16 are connected at various intervals to the feeder 13, switches 19 and 20 being used between the loads 14 and 15, and 15 and 16, respectively, so as to break the feeder 13 into a plurality of sections 13', 13'', and 13'''. According to this invention, the switches 19 and 20 need not be expensive circuit breakers having interrupting capacity sufficient to interrupt fault currents, but may be disconnecting switches since they are opened under fault conditions only after the fault current has been interrupted by the circuit breaker 12. While the switches 19 and 20 may be ordinary disconnecting switches, it is preferred to use some form of load-break disconnecting switch having an arc extinguisher capable of interrupting load currents so that the same switches 19 and 20 may also be manually opened while normal load current is flowing, if it is desired to sectionalize the feeder or to de-energize the sections of the feeder beyond one of the switches. One form of such a load-break disconnecting switch is shown in the application of H. J. Lingal, Serial No. 253,321, filed October 26, 1951, now Patent No. 2,769,063.

The switches 19 and 20 are provided with electrically controlled opening or trip circuits 21 and 22 which permit the switch 20 to be set to open in response to one operation of the circuit breaker 12, while the switch 19 may be set to operate in response to two or more closely successive operations of the circuit breaker 12. This permits selective opening of the switches 19 and 20, so as to open only the switch 20 in the event that a fault occurs beyond that switch, and to open the switch 19 in the event that a fault occurs between the switches 19 and 20.

Referring to Fig. 2, a diagrammatic view of the trip circuit 21 is shown, the trip circuits 21 and 22 being similar. The switch 19 is, for example, provided with suitable closing means, and electrically controlled opening means, being for example biased open by a spring 23 and latched closed by latch means 24 having an electrically operated trip device 25, which is connected to the control buss conductors 26 and 27 by means of a trip relay 28 having an operating winding 28'. Control of the trip relay 28 is effected by counting means 29 comprising a plurality of counting relays 30, 31, and 32 in conjunction with a multiposition selector switch 35 which connects the trip relay 28 to provide for tripping the switch 19 in response to either 1, 2, or 3 interruptions of a fault current by operations of the circuit breaker 12.

Operation of the counting relays 30, 31, and 32 is effected by means of a pulsing relay 36 having an operating winding 37 which is connected to the conductors 26 and 27 through the contacts of any one of a plurality of overcurrent relays 38, 39, 40, or 41 associated with the phase and the neutral conductors of the feeder section 13'. Each of the overcurrent relays is connected to its associated conductor by means of a current transformer 42, and each of the overcurrent relays is provided with indicating means for indicating which of the relays operates, including an armature 44 and an operating solenoid 45 connected in series circuit relation with the relay contacts. A time delay relay 48 having an operating winding 49 is provided to effect reset of the counting relays 30, 31, and 32 in the event that a predetermined number of operations of the circuit breaker do not occur within a predetermined interval of time. An interlock relay 50 is provided to prevent energization of the pulse relay 36 through the holding circuit for the trip relay 28.

Should a fault occur on feeder section 13″ at the point x, the overcurrent relays for the switch 20 will not be affected and no operation of the switch 20 will occur. However, one or more of the overcurrent relays for switch 19 will operate, completing an energizing circuit for the pulse relay 36 at, for example, contact 38a. Since the pulse relay 36 has a relatively high resistance winding 37, the indicating means of the overcurrent relay 38 does not operate, since the coil 37 limits the current below the operating value of the armature 44. When the pulse relay 36 operates, it completes an energizing circuit for counting relay 30 through a circuit including contact member 31d, contact member 36b, contact member 31b, resistor 52, and contact member 48a. When the circuit breaker 12 opens the first time, the overcurrent relay 38 is deenergized and opens its contacts to release the pulse relay 36. The release of relay 36 completes an energizing circuit for counting relay 31 in series with counting relay 30 through contact members 30b and 48a, since the opening of contact member 36b removes a shunt including the resistor 52 around the operating coil of relay 31.

When the feeder breaker 12 recloses the first time, the overcurrent relays will again be operated if the fault is still on the feeder, the pulse relay 36 being again energized. Since the multiposition switch 35 is in the No. 2 position for operation in response to two openings of the circuit breaker 12, a circuit will be completed through contact member 50a, contact member 28c, resistor 54, contact member 31h and the No. 2 position of switch 35 paralleling the operating winding 37 of the pulse relay 36. This permits sufficient current to flow through the operating winding 45 to actuate the armature 44 of the indicator on the overcurrent relay 38 to indicate that the fault occurred on this phase. When the pulse relay 36 is energized, it completes a shunt around the operating coil of counting relay 30 through contact member 36b. Relay 30 releases and completes an energizing circuit for counting relay 32 through a circuit including contact member 48a, contact member 30c and contact member 31f. The energization of counting relay 32 completes an energizing circuit for the trip relay 28 through a circuit including contact member 50a, the operating winding 28′, contact member 32e, and switch member 35a in the No. 2 position of control switch 35. Contact member 28a provides an energizing circuit for the interlocking relay 50 which prevents the pulse relay 36 from being held energized by the holding contact 28b of the trip relay, which provides a holding circuit for relay 28 through contact 48a and the circuit traced through contact member 32e the No. 2 position of switch 35. Another contact 28c of the trip relay interrupts the indicator circuit through resistor 54 so as to prevent interrupting any high values of current at the contacts 38a of the overcurrent relay.

When the circuit breaker 12 opens the second time, the overcurrent relays are again deenergized and open their contacts. This causes the pulse relay 36 to be deenergized. A circuit is thereupon completed through the make contact member 28a and the break contact member 36a for the trip device 25 of the switch 19, causing the switch to open. Since the pulse relay 36 is only deenergized when the feeder circuit 13 is interrupted by the breaker 12, the switch 19 opens only during an off-current period. When the breaker 12 recloses, the fault will have been removed by the opening of the switch 19 and service is restored to the load 14 on the breaker side of switch 19. The time delay relay 48 operates after a predetermined interval of time and interrupts the energizing circuits for the counting relays 30, 31, and 32 so as to reset the equipment. The indicator for the overcurrent relay 38 remains operative until manually reset so as to indicate which of the conductors of the feeder circuit was faulted.

The three counting relays 30, 31, and 32 provide six distinct circuit arrangements for successive energizations and deenergizations of the pulse relay 36 as follows:

First energization of relay 36_____ Relay 30 energized.
First deenergization of relay 36____ Relays 30 and 31 energized.
Second energization of relay 36_____ Relays 31 and 32 energized.
Second deenergization of relay 36___ Relay 32 energized.
Third energization of relay 36_____ Relays 30 and 32 energized.
Third deenergization of relay 36____ Relays 30, 31, and 32 energized.

By using a multiposition selector switch 35 in conjunction with the counting relays 30, 31, and 32, a trip circuit is provided for opening the electrically tripped switch 19 after 1, 2, or 3 reclosures of the circuit breaker 12, depending on the operating position of the switch 35.

This enables the same kind of trip circuit to be used with each of the serially related sectionalizing switches 19 and 20. The selector switch 35 of switch 20 would, for example, be set in position No. 1 so as to effect opening of switch 20 in response to one opening of reclosing circuit breaker 12, while the switch 35 of switch 19 would as described be set in the No. 2 position to open switch 19 only after two operations of breaker 12. For a fault beyond switch 20, the counting means for switches 19 and 20 count the first operation of breaker 12. Switch 20 opens and removes the fault, while switch 19 remains closed. Breaker 12 thereupon recloses and stays closed.

From the above description and the accompanying drawing, it will be apparent that we have provided in a simple and effective manner for controlling an electrically tripped switch, such as a disconnect switch or the like, so as to provide for selectively opening the switch after 1, 2, or 3 operations of an automatic reclosing circuit breaker, to provide for sectionalizing feeder circuits or the like. A sectionalizing trip circuit embodying the features of our invention is simple and inexpensive to manufacture and is reliable and effective in operation. By using an electromagnetically tripped disconnect switch in the manner described, a reliable and inexpensive sectionalizing switch may be provided for relative high voltage lines from 7.5 kv. to 69 kv., for example.

Since certain changes may be made in the above described invention without departing from the spirit and scope thereof, it is intended that all the matter contained in the above description and shown in the accompanying drawing, shall be considered as illustrative and not in a limiting sense.

We claim as our invention:
1. Control apparatus for an air break disconnect switch having electroresponsive opening means comprising, a current responsive device, a control relay operated by the current responsive device, a plurality of counting relays, circuit means connecting the counting relays to operate sequentially in response to successive operations of the control relay, a trip relay, means including a multiposition switch operable to connect the trip relay to operate in response to different ones of the counting relays, circuit means connecting the opening means to operate when the trip relay operates and the control relay is unoperated, and relay means connected to operate in response to operation of the trip relay to isolate the control relay from the trip relay.

2. Control apparatus for a switch having electroresponsive opening means for opening the switch comprising, a current responsive relay, a control relay having normally open and normally closed contacts operated by the current responsive relay, a plurality of counting relays, circuit means including said normally open contacts connected to operate the counting relays in sequence, a time delay relay operated by the counting relays to interrupt said circuit means after a predetermined time, a trip relay having normally open contacts, circuit means including a multiposition switch connecting the counting relays to operate the trip relay in response to operation of a different predetermined one of the counting relays for each position of the multiposition switch, and circuit means including the normally closed contact of the control relay and the normally open contacts of the trip relay connected to operate the trip means.

References Cited in the file of this patent

UNITED STATES PATENTS

| | | |
|---|---|---|
| 1,751,380 | Anderson | Mar. 18, 1930 |
| 2,011,361 | Hammond | Aug. 13, 1935 |
| 2,264,280 | DeCroce | Dec. 2, 1941 |
| 2,292,935 | Gay | Aug. 11, 1942 |
| 2,375,413 | Guenther | May 8, 1945 |
| 2,498,249 | Cook | Feb. 21, 1950 |